US009063936B2

(12) United States Patent
Ramnath Krishnan et al.

(10) Patent No.: US 9,063,936 B2
(45) Date of Patent: Jun. 23, 2015

(54) IMAGE, AUDIO, AND METADATA INPUTS FOR KEYWORD RESOURCE NAVIGATION LINKS

(75) Inventors: Harshini Ramnath Krishnan, Herndon, VA (US); Neel Goyal, Rockville, MD (US); Vincent Raemy, Givisiez (CH)

(73) Assignee: VERISIGN, INC., Reston, VA (US)

( * ) Notice: Subject to any disclaimer, the term of this patent is extended or adjusted under 35 U.S.C. 154(b) by 370 days.

(21) Appl. No.: 13/341,815

(22) Filed: Dec. 30, 2011

(65) Prior Publication Data

US 2013/0170752 A1    Jul. 4, 2013

(51) Int. Cl.
*G06K 9/00* (2006.01)
*G06F 17/30* (2006.01)

(52) U.S. Cl.
CPC .... *G06F 17/30047* (2013.01); *G06F 17/30026* (2013.01); *G06F 17/30041* (2013.01)

(58) Field of Classification Search
CPC ................................................ G06F 17/30244
See application file for complete search history.

(56) References Cited

U.S. PATENT DOCUMENTS

| | | | |
|---|---|---|---|
| 5,729,741 A | 3/1998 | Liaguno et al. | |
| 6,332,158 B1 | 12/2001 | Risley et al. | |
| 7,010,519 B2 | 3/2006 | Tada et al. | |
| 7,305,394 B2 | 12/2007 | Fellman | |
| 7,374,077 B2 | 5/2008 | Shimura | |
| 7,702,681 B2 | 4/2010 | Brewer et al. | |
| 7,853,558 B2 | 12/2010 | Brindley | |
| 7,917,514 B2 | 3/2011 | Lawler et al. | |
| 8,024,359 B2 | 9/2011 | Rathus et al. | |
| 8,078,632 B1* | 12/2011 | Stoutamire et al. | 707/759 |
| 8,204,896 B2 | 6/2012 | Hirabayashi | |
| 8,306,872 B2 | 11/2012 | Inoue et al. | |
| 8,458,038 B2 | 6/2013 | Ando | |
| 2002/0156866 A1 | 10/2002 | Schneider | |
| 2003/0184653 A1 | 10/2003 | Ohkubo | |
| 2004/0126038 A1 | 7/2004 | Aublant et al. | |
| 2005/0125451 A1 | 6/2005 | Mooney | |
| 2005/0271352 A1 | 12/2005 | Yokouchi | |
| 2006/0230380 A1 | 10/2006 | Holmes et al. | |
| 2007/0027911 A1 | 2/2007 | Hakala et al. | |
| 2007/0130126 A1* | 6/2007 | Lucovsky et al. | 707/3 |
| 2008/0005105 A1* | 1/2008 | Lawler et al. | 707/6 |

(Continued)

FOREIGN PATENT DOCUMENTS

KR    10-2004-0055522 A    6/2004
KR    10-2007-0089337 A    8/2007

OTHER PUBLICATIONS

Satoh, Nakamura, and Kanade, Name-It: Naming and Detecting Faces in News Videos, Multimedia, IEEE, Jan.-Mar. 1999 (14 pages).

(Continued)

*Primary Examiner* — Bhavesh Mehta
*Assistant Examiner* — Andrew Moyer
(74) *Attorney, Agent, or Firm* — MH2 Technology Law Group, LLP

(57) ABSTRACT

A system, method, and computer-readable medium, is described that implements a resource navigation links tool that receives one or more inputs, extracts information from the inputs into a submission string, submits the submission string to a resource navigation links tool, and receives resource navigation links based on the submission string. Inputs types may include images, audio clips, and metadata. The inputs sources may be processed to extract information related to the image source to build the submission string.

41 Claims, 10 Drawing Sheets

(56) References Cited

U.S. PATENT DOCUMENTS

| | | |
|---|---|---|
| 2008/0005127 A1 | 1/2008 | Schneider |
| 2008/0126415 A1* | 5/2008 | Chaudhury et al. ....... 707/104.1 |
| 2008/0195664 A1 | 8/2008 | Maharajh et al. |
| 2008/0317346 A1 | 12/2008 | Taub |
| 2009/0003704 A1 | 1/2009 | Hwang et al. |
| 2009/0100050 A1 | 4/2009 | Erol et al. |
| 2009/0287655 A1 | 11/2009 | Bennett |
| 2009/0327272 A1 | 12/2009 | Koivunen |
| 2010/0023507 A1* | 1/2010 | Kim et al. ......................... 707/5 |
| 2010/0088726 A1 | 4/2010 | Curtis et al. |
| 2010/0146001 A1 | 6/2010 | Lee |
| 2010/0146119 A1 | 6/2010 | Lee |
| 2010/0157096 A1 | 6/2010 | Park et al. |
| 2010/0169492 A1 | 7/2010 | Lee |
| 2010/0223113 A1 | 9/2010 | Lee |
| 2010/0223143 A1 | 9/2010 | Lee |
| 2010/0250136 A1 | 9/2010 | Chen |
| 2010/0293054 A1* | 11/2010 | Lieberman ................. 705/14.54 |
| 2011/0081084 A1 | 4/2011 | Takahashi et al. |
| 2011/0082735 A1 | 4/2011 | Kannan et al. |
| 2011/0238503 A1 | 9/2011 | Naini |
| 2011/0258188 A1 | 10/2011 | Abdalmageed et al. |
| 2012/0083294 A1 | 4/2012 | Bray et al. |
| 2012/0084276 A1* | 4/2012 | Heimendinger .............. 707/708 |
| 2012/0271878 A1 | 10/2012 | Nicks et al. |

OTHER PUBLICATIONS

Yeh, Tollmar, and Darrell, Searching the Web with Mobile Images for Location Recognition, Computer Vision and Pattern Recognition, 2004 (CVPR 2004), Jun. 27-Jul. 2, 2004, available at http://groups.csail.mit.edu/vision/vip/papers/yeh_cvpr04.pdf (6 pages).

Jason Edward Kaufman, For Exhibits, the Future Is Virtually Here, Oct. 2, 2011, The Washington Post (4 pages).

Yaegashi and Yanai, Can Geotags Help Image Recognition?, Lecture Notes in Computer Science 2009, vol. 5414, 2009 (1 page).

Dulbandzhyan, Duncan, and Rimoin, A Web-Enabled Research Database with Image Recognition, Proc AMIA Symp. 1999: 1052 (1 page).

Supplemental Extended European Search Report, dated Mar. 11, 2013, European Application No. 12197510, filed Dec. 17, 2012, p. 1, published by the European Patent Office.

Extended European Search Report dated May 7, 2013, European Application No. 12197271.5, filed Dec. 14, 2012, pp. 1-6.

Notice of Allowance and Fees Due dated Oct. 9, 2014, U.S. Appl. No. 13/341,807, filed Dec. 30, 2011, pp. 1-23.

* cited by examiner

IMAGE, AUDIO, AND METADATA INPUTS FOR KEYWORD RESOURCE NAVIGATION LINKS

TECHNICAL FIELD

This disclosure relates to image, audio file, and metadata based searching for the purposes of finding keyword based resource navigation links.

BACKGROUND

Internet search engines operate by taking an input string, performing a search algorithm, and returning website links based on the input string. Alternative search engines exist to find images based on an input image or find a matching audio clip based on an input audio clip. It would be useful, however, to provide an input image, audio clip, or metadata source and provide web resource links based on the data in an abstracted state, or, in other words, based on the content and surroundings of the input data.

For example, suppose a user was on vacation and wanted to know information about a particular landmark. The user could utilize a smart phone or hand held device to take a picture of the landmark and submit it to the disclosed resource navigation links tool. The tool could analyze the data and optionally the metadata associated with the source and image data file, determine the content of the image data, and return to the user the most pertinent or a list of pertinent web resources for further study. The delivery may be back to the handheld device in a text or audio format, back to an email address, a really simple syndication (RSS) feed, posted to a social networking site, posted to a blog or other online aggregator, or a combination of thereof.

In another example, a user may want to call the closest Toyota car dealership. With the resource navigation links tool, the user may simply take a picture of a Toyota car, submit the picture to the tool along with the user's GPS coordinates, and receive back resource links including contact information for the closest Toyota car dealership.

A resource navigation links tool that could take alternative data sources as an input and provide resource navigation links based on data derived from the data sources would be useful to assist in web navigation. In particular, a tool would be useful that may take as an input an image data file, an audio data file, and/or metadata sources, and based on that input develop and provide resource navigation links.

Image processing and manipulation has evolved beyond the processing of individual images, but also includes the interrelation of images and image data, such as in the example of comparing an image with a library of images for similarities. Images may be compared on a pixel level, on a content level, or a combination of the two. When comparing images on a pixel level, other images with similar pixel characteristics may be found by examining the image blocks of pixels for similarities. When comparing images on a content level, first the image is characterized by its content by recognizing objects within the image and then that content data is used to perform a text or image search.

One example of comparing images on the pixel level involves processing the blocks of pixels that make up an encoded and compressed image file. Images files are compared at the pixel level typically by indexing the discrete cosine transformation (DCT) blocks of a subject image and comparing that information relationally to a database of DCT block patterns. Because DCT blocks represent frequency domain data, representations of blocks of pixels, comparisons may be made at low frequency data points across many DCT blocks. Matching and relevance may be determined by the amount of intersection of DCT blocks based on block order, block similarity, and percentage of blocks within a certain similarity. Other known and yet to be developed ways of representing images in the frequency domain may also be used.

Object recognition uses extendible trainable libraries for object recognition within an image. For example, a picture of a car may be identified as a car by recognizing the edge detail of a shape or shapes within the image data file. Commercially available object recognition software may also identify the car as a Chevrolet based on an emblem found on the car. The object recognition software may further identify the car as a Chevrolet Camaro based on other identifying markers, such as body lines, wheel designs, colors, or text located on the car. In a particular image, the object recognition software may identify several different objects and create a manifest of objects. The software may also have multiple levels of granularity in its recognition result as well as a confidence level. For example, the software may with 99% confidence recognize a car, 70% confidence recognize a Chevrolet, 20% confidence recognize a Camaro, and with 10% confidence recognize a 2010 model.

Object recognition libraries may be trainable and extendible by training the libraries to recognize objects that it cannot recognize or has not encountered before. New object information may be input by a user and stored in the software so that the next time recognition is requested of the object (or a similar object), the software may recognize the object.

Audio clips may be processed either by comparing the actual audio clip with other audio clips or by recognizing the words spoken within the audio clip. For example, if a user is listening to a particular song, he may record part of the song with a mobile phone and submit it for processing. The audio recognition engine may identify the song by performing a Fast Fourier Transform (or similar transform function) and comparing it to a database of audio clips. Similar to comparing image data DCT blocks, comparing a subject audio clip to a database of audio clips in the frequency domain, allows the comparison to be done at lower frequencies, thereby increasing the chance of a match. Matching and relevance may be determined by the amount of intersection of frequency data within a certain similarity.

In another example, the user may record a voice memo, submit it to a speech recognition engine and retrieve a textual representation of the spoken words. Similar to object recognition software, speech recognition or speech-to-text software typically uses a trainable database to recognize the way that words are spoken individually and in groups to find matching words and phrases.

Metadata may simply be understood as data about data. It is often embedded in any file representation of data. Metadata may include the time and date a file was created or edited. It may include the location or identifying information about the user creating the file. It may include server or other information about the machines that have created, modified, transmitted, or received the file. Metadata may be extracted from image files and audio files, and may also include metadata derived from alternative Internet sources, such as Twitter Tweets, emails, or other sources.

The information derived from images, audio files, or metadata may be used as inputs into a resource navigation link tool and service. Optionally, the information may be manipulated prior to inputting into the resource navigation link tool and service for better quality results.

Although the information derived from images, audio files, or metadata sources may be used to submit to a search engine, the data may instead be used to retrieve results from a keyword resource navigation link database. The database may provide custom links without returning thousands of resources that a search engine may typically return. In addition, the custom links found using the keyword resource navigation link tool may be sponsored by entities that wish to associate their resource with particular keywords.

SUMMARY

A system, method, and computer-readable medium, is described that provides a tool for taking an image, audio clip, and/or metadata source as an input and providing resource navigation links based on the input.

In one embodiment, an image may be processed using a pixel based image comparison engine and database of indexed images. When comparing images on a pixel level, other images with similar pixel characteristics may be found by examining the images' respective image blocks of pixels (known as "DCT blocks") for similarities. Other known pixel-based image comparison techniques may also be used. Data from the result set may be extrapolated to develop a context for which the images were found. This extrapolated information may be passed to a resource navigation link tool for providing related resource links.

In another embodiment, an image may be processed using object identification—i.e., examining the larger image itself to determine the objects in the image—which uses extendible, trainable libraries for object recognition within an image. The object identifier discovers objects and returns object information. For a particular image, the object identifier may identify several different objects and create a manifest of objects. The object identifier may also have multiple levels of granularity in its recognition results, as well as a confidence level. Object information may then be passed to resource navigation link tool for providing related resource links.

In another embodiment, an audio clip may be processed using a text-to-speech conversion engine to convert speech in the audio clip to textual representations of the words. The text may then be passed to a keyword resource navigation link tool to provide related resource links. Alternatively, the audio clip may be processed by applying a Fast Fourier Transform (or other mathematical operation) to represent the clip in the frequency domain. The clip may then be compared to an index of audio files to find potential matches. Accompanying information in the index may be used to provide information to pass to a resource navigation link tool for providing related resource links.

In another embodiment, metadata may be extracted from many different sources to provide input into a resource navigation link tool for providing related resource links. For example, a user may take a picture using a mobile device that tags the resulting image file with information about when it was taken, where it was taken, and the device it was taken on. The location and other metadata may be used to provide resource navigation links based on that data. Similarly, a user may record an audio message or record an audio clip, and metadata associated with the resulting audio file may also be extracted and used as an input to a resource navigation links tool. Metadata extracted from data files may be used in combination with or without the underlying data itself, i.e., only the metadata may be used and the metadata may be used in combination with the source from which it was extracted using additional data techniques as described herein.

In another embodiment metadata may also be used without a picture or audio clip being taken. For example, a user may make a resource navigation link request from the user's GPS enabled mobile device that passes the GPS coordinates of the user's location at the time of the request. The resource navigation link tool may then find the closest point of interest to the location and make resource navigation link suggestions based on that information. Metadata may also come from social networking sites, emails, or blogs. Some of these sites may include metadata with a post, like a Twitter Tweet. Metadata may also be found in blog entries and embedded in other web pages. The tool may extract the metadata available in any source and provide resource navigation links based on the metadata.

It is to be understood that both the foregoing general description and the following detailed description are exemplary and explanatory only and are not restrictive of the application, as claimed.

The accompanying drawings, which are incorporated in and constitute a part of this specification, illustrate embodiments of the application and together with the description, serve to explain the principles of the application.

DETAILED DESCRIPTION

Reference will now be made in detail to the exemplary embodiments. Wherever possible, the same reference numbers will be used throughout the drawings to refer to the same or like parts.

Name Suggestion Tool

Figure 1:
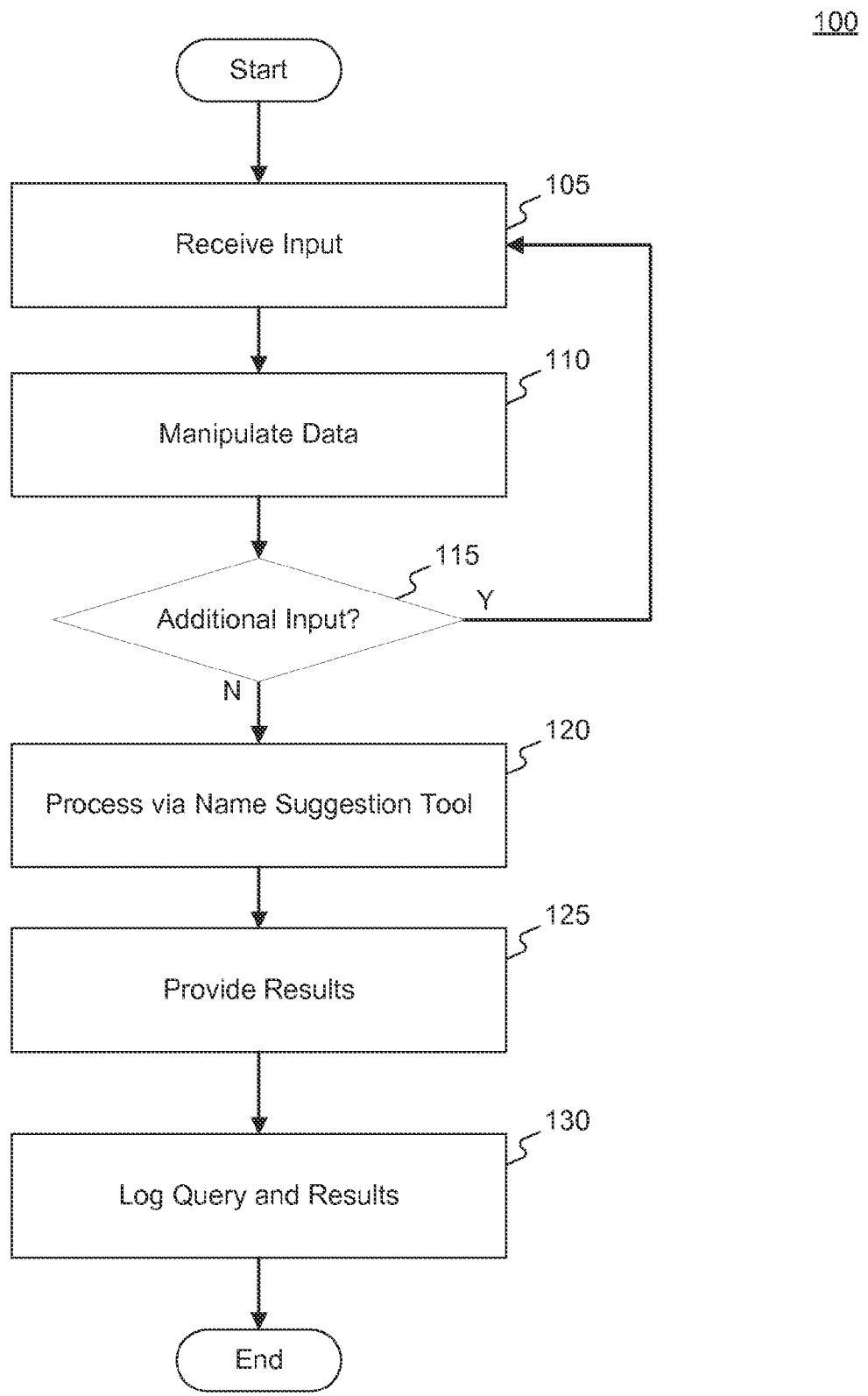
FIG. 1 is an exemplary illustration of process of providing name suggestions based on a variety of inputs.

FIG. 1 illustrates an exemplary process 100 of providing name suggestions based on a variety of inputs, including image data, audio data, and metadata extracted from various sources. The process 100 may utilize various hardware components implemented in a system or may reside on a computer-readable medium as instructions to be executed by a processor. Computer-readable media are known to have non-transitory characteristics. The hardware components may contain one or more databases located thereon in support of the operation of process 100. The databases contained may be implemented in a commercial, open source, or proprietary database program or may be contained in log files, flat files, or any other data storage mechanism. Further, the databases need not be on a separate system, but may be incorporated with other services on one or more hardware components.

As explained in further detail below, in an embodiment, process 100 receives input (step 105). The input may come from image data, audio data, metadata found along with the image data or audio data, and/or metadata found extracted from other sources. In step 105, the process 100 may analyze the data input, extract information from the data, and based on the extracted information, provide words in the form of a submission string that may be used in the name suggestion tool. Step 105 will be described in further detail below. Optionally, the input data may be manipulated (step 110) to provide refined information for the name suggestion tool. The data may be manipulated by filtering out less pertinent or redundant data. For example, common words may be filtered out or the input data may be prioritized to place more significant words and phrases at the beginning of the submission string prior to submitting to the name suggestion tool. In step 115, described in further detail below, the exemplary process 100 determines whether any additional inputs should be processed processing. If no additional inputs are to be processed, the submission string is sent to a name suggestion tool in step 120. Optionally, the submission string may be sent along with preferences to assist the name suggestion tool in providing desirable results.

The name suggestion tool receives a submission string and offers domain name suggestions for registration based on the submission string. The name suggestion tool may base its results on a number of factors, including whether a preference for a particular TLD is indicated, the availability for registration of a domain name (presently unregistered), the availability for purchase of a domain name (presently registered but offered for sale), the availability for bidding on a domain name (presently registered but offered for auction), the order of the words in the submission string (most important words and phrases in the front and least important words and phrases towards the back or the other way around), and/or Boolean words found in the submission string (e.g., "AND," "OR," and "NOT"). After the name suggestion tool receives the submission string and optional preference settings, it transmits the results back.

The results are provided in step 125. The providing may be based on the method of input. For example, if the input was submitted via an application on a smart phone or hand held device, then the results may be provided via the application on the device. Alternatively, if the input was submitted via a web browser on a computer, then the results may be provided via the web browser. Optionally, the user may provide an email address and the results may also be emailed to the user, along with links to a registration page. The links may enable the user to register one of the suggested domain names. The links may provide session detail to retrieve the results in a web browser. Once the results are provided, the process 100 may accept a submission to register one or more of the suggested domain names. In the case where a domain name is for sale or auction, but already registered, the process 100 may accept a submission to offer to purchase one or more of the suggested domain names for sale or auction. The methods of registration or purchase/auction may be combined in one transaction.

The user may be given an option to bookmark or mark as a favorite one or more of the suggested domain names for later retrieval. When a user bookmarks a suggested domain name or an entire set of suggested domain names, the user may retrieve the suggested domain name by the bookmark or by the listing of favorites. Upon retrieval, the system may indicate the present registration and availability status of the bookmarked or favorite domain name(s). In addition, the user may subscribe to an alert system for bookmarked or favorite domain names to watch and be notified when they become available for registration. Furthermore, the user may categorize the bookmarks and favorites into user-created or pre-defined categories. Categories may be suggested by the domain name suggestion tool based on the input data. Categories may be descriptive text labels and the like, or may simply be the input data. For example, the domain name suggestion tool may save the input device and use the input data itself as the category. One skilled in the art will recognize many variations available of the bookmarking and favorite marking functions of the domain name suggestion tool. For example, in addition to the user being able to bookmark or mark domain names as favorites, the user may be able to save all of the domain name suggestions. The user may also be able to save the search itself, that is, resubmit the search based on the same input at a later time, when the availability of different domain names may result in different domain name suggestions.

The process 100 may log in step 130 the domain name suggestion input submission information from step 105, log the pre-manipulation data from step 110, and log the submission string in step 120. Each input data source may be logged accordingly. The results from the name suggestion tool in step 120 may also be logged. The logging may provide keying information to correlate all of the input data and result data. The logging information may be used to generate diagnostic and statistical information. Diagnostic information may assist the service provider to troubleshoot or further refine the process. Statistical information may be used to find trending data pertinent to the operation of the process. The process 100, may provide log, diagnostic, and statistical information through an interface.

Figure 2:
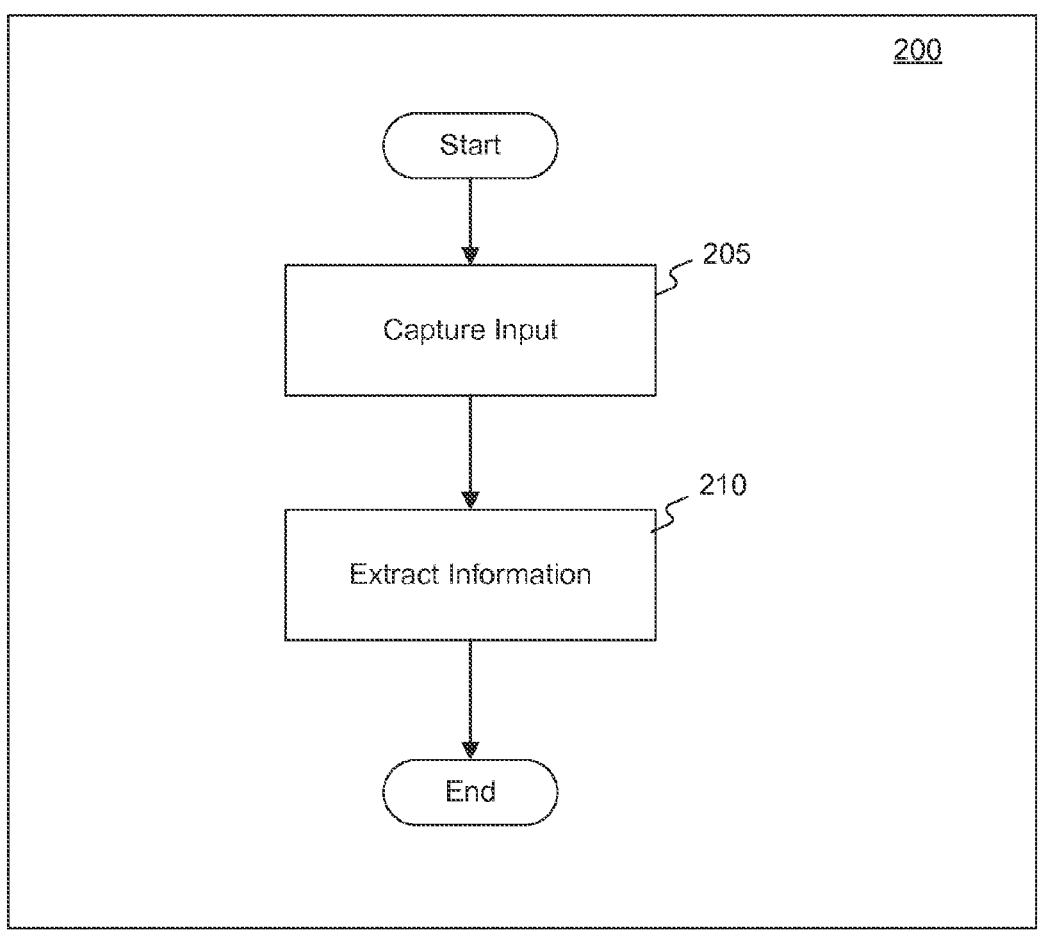
FIG. 2 is an exemplary illustration of the step of "Receive Input" found in FIG. 1.

Turning back to step 105, FIG. 2 provides an exemplary illustration of step 105, "Receive Input." In step 205, input is captured. Input may be captured from the user submitting an audio file or image file to the name suggestion tool process 100. Input may also be captured from online sources. For example, a URL may be provided from which to extract information. Images, audio files, or metadata present at the URL (or referenced in HTML present at the URL) may be extracted and processed as an input. In step 210, data is extracted from the input data sources. The extraction of data from different types of inputs is further described below with reference to FIGS. 3, 4, and 5.

Figure 3:
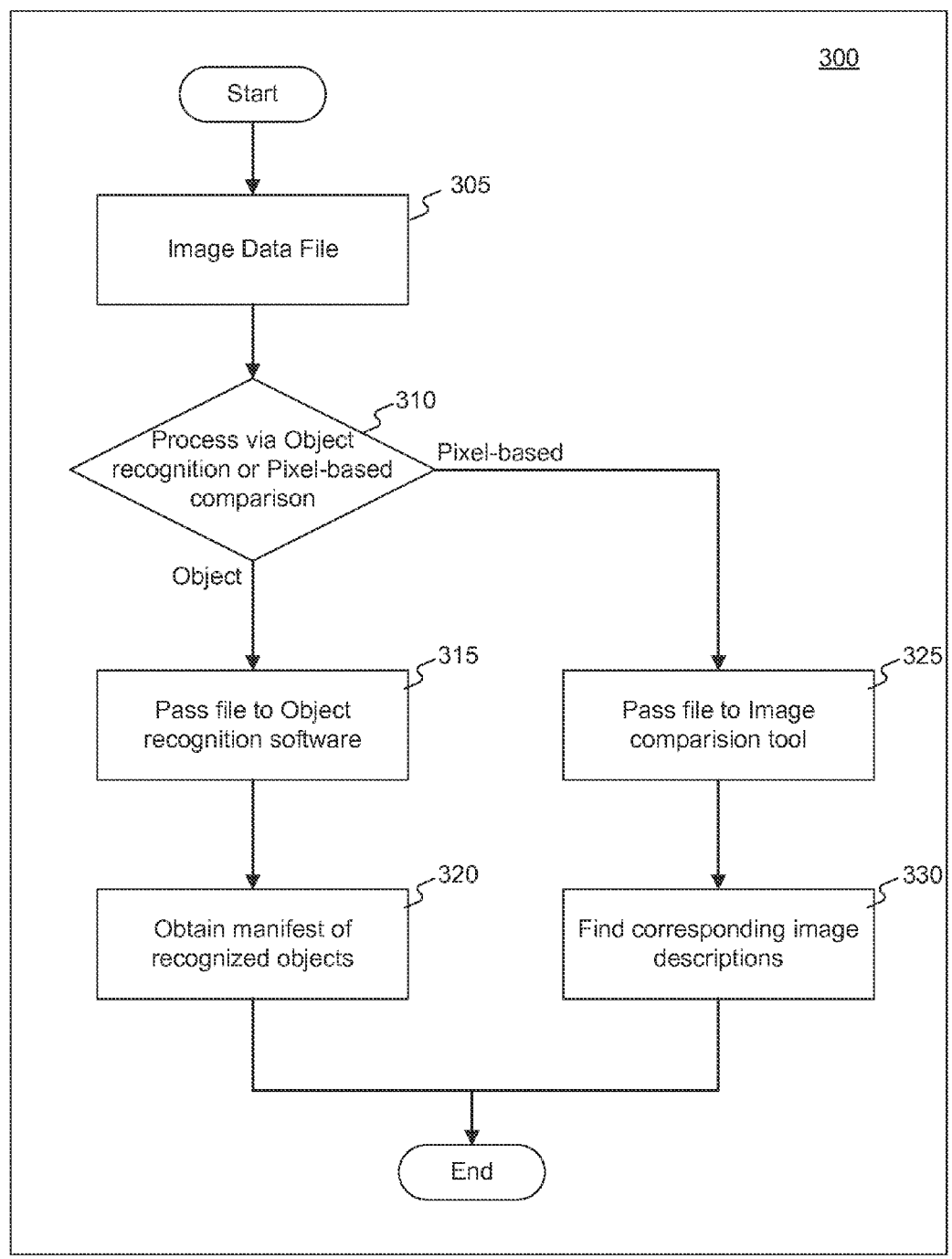
FIG. 3 is an exemplary illustration of the step "Capture Input" found in FIG. 2 pertaining to image data files.

FIG. 3 provides an exemplary illustration of one possible execution (exemplary process 300) of step 205 corresponding to the processing of an image data file. In step 305, the image data file is received. The image data file may be processed using object recognition, image comparison, optical character recognition (OCR) (not shown) or a combination of any of the three. In step 310, if the image data file will be processed using object recognition, then execution continues to step 315. The file is passed to object recognition software in step 315. The object recognition software may be a commercially available product or may be custom built. In addition to the image data file, the object recognition software may also receive configuration inputs and other data to assist the object recognition software. For example, the object recognition software may receive metadata associated with the image data file pertaining to the location the picture was taken, the orientation of the picture, the aperture and lens settings of the camera taking the picture, the time of day the picture was taken, and the like. The object recognition software may process the image data file and return a manifest of recognized objects in step 320. The object recognition software may indicate the confidence level associated with each of the recognized objects. The software may also provide varying degrees of granularity associated with the recognized objects. Object recognition may also employ the use of OCR to recognize and identify characters captured within the image file. The OCR function may be performed using a separate tool or integrated with the object recognition tool. The recognized characters may be used to enhance the object recognition tool's effectiveness or may simply be returned as part of the results.

Turning back to step 310, if the image data file will be processed using an image comparison tool, then execution continues to step 325. The file is passed to an image comparison tool in step 325. The image comparison tool may be a commercially available product or may be custom built. In addition to the image data file, the image comparison software may also receive configuration inputs and other data to assist the image comparison software. For example, the image comparison software may receive metadata associated with the image data file pertaining to the location the picture was taken, the orientation of the picture, the aperture and lens settings of the camera taking the picture, the time of day the picture was taken, and the like. The image comparison software may process the image data file and return a manifest of associated keywords in step 340. The associated key words may be derived by extracting information pertaining to matching images. For example, the image comparison software may find several matching images. Descriptions of these images may be used to develop key words or a corresponding description of the subject image file. It may be that an image would compare closely to several distinct images because of different comparison objects within the same image. In this case, the image comparison software may provide a manifest of descriptions according to the image. In addition to the descriptions, the image comparison software may also provide a confidence level associated with the descriptions. The image comparison tool may also employ the use of OCR to recognize and identify characters captured within the image file. The OCR function may be performed using a separate tool or integrated with the image comparison tool. The recognized characters may be used to enhance the image comparison tool's effectiveness or may simply be returned as part of the results.

Both object recognition software and image comparison software may each be used on a single image data file by proceeding through steps 315-320 and 325-330 in turn, respectively. The steps may be executed in any order. Object recognition generally works by identifying the objects within the image data file by abstracting edge detail in the image and using object recognition techniques. Object recognition software uses extendible learning libraries to recognize objects. Image comparison software generally works by extracting the low frequency components from the image pixels on a block-by-block basis (e.g., DCT blocks) or using waveform coding (e.g., wavelets). A database of similarly extracted low frequency components is used to identify similar block or wavelet patterns in the frequency domain. Once similar images are identified, description information about the similar images can be used as a proxy for the subject image data file. If a similar image was extracted from a web crawler or does not otherwise have much description information associated with it, then words surrounding the image may be used to find pertinent description information. For example, suppose the image comparison database is made up of images that were found on the Internet and indexed into the database. Text information located on the same webpage as the found image may be used to discern contextual information about the image. This context information may also be indexed into the database of images or may be processed once the similarity has been determined.

OCR may be used to identify and extract characters within the image. OCR uses algorithms to identify portions of an image as containing a graphical representation of text and then identify characters based on the portions of an image recognized as text. The data retrieved via OCR may be filtered or processed through contextual text images to further recognize dictionary words or common phrases to resolve suspect characters. For example, OCR may identify several character candidates for a symbol similar to an "O." It could be recognized as a little-o, a capital-O, or a zero. By analyzing the surrounding characters and trying to identify the contextual nature, the suspect character may properly be characterized as a capital-O (or whatever character it happens to be).

Figure 4:
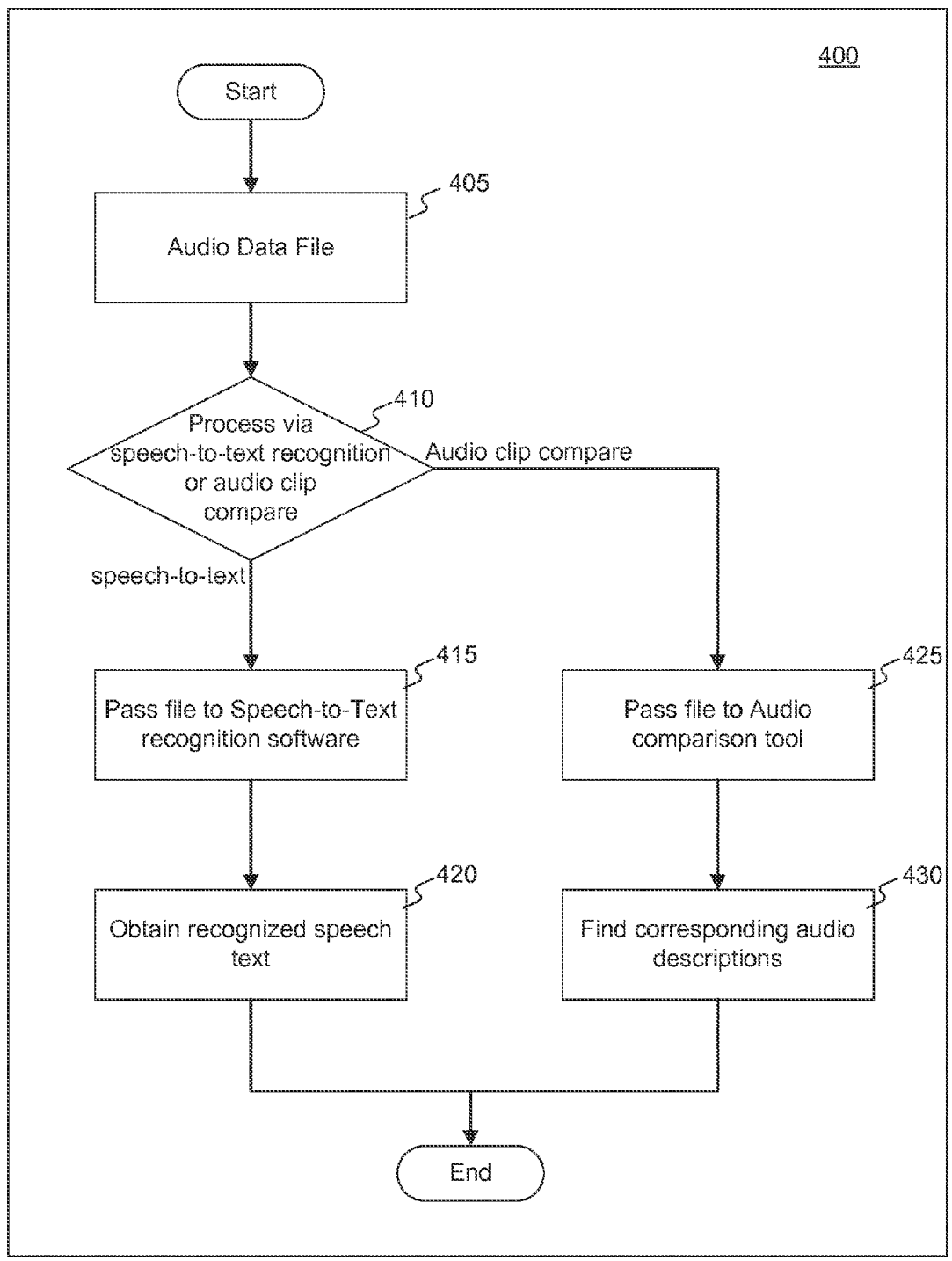
FIG. 4 is an exemplary illustration of the step "Capture Input" found in FIG. 2 pertaining to audio data files.

FIG. 4 provides an exemplary illustration of one possible execution (exemplary process 400) of step 205 corresponding to the processing of an audio data file. In step 405, the audio data file is received. The audio data file may be processed using speech-to-text recognition, audio clip comparison, or a combination of the two. In step 410, if the audio data file will be processed using speech-to-text recognition, then execution continues to step 415. The file is passed to speech-to-text recognition software in step 415. The speech-to-text recognition software may be a commercially available product or may be custom built. In addition to the audio data file, the speech-to-text recognition software may also receive configuration inputs and other data to assist the speech-to-text recognition software. For example, the speech-to-text recognition software may receive metadata associated with the audio data file pertaining to the location the audio clip was taken, the gain settings of the microphone taking the clip, the time of day the clip was taken, and the like. The speech-to-text recognition software may process the audio data file and return a string of recognized speech in step 420. The speech-to-text recognition software may indicate the confidence level associated with each of the recognized words. The string may further be process (not shown) by checking the string for logical sense, and making any adjustments based on common word groupings and the like.

Turning back to step 410, if the audio data file will be processed using an audio clip comparison tool, then execution continues to step 425. The file is passed to an audio clip comparison tool in step 425. The audio clip comparison tool may be a commercially available product or may be custom built. In addition to the audio data file, the audio clip comparison software may also receive configuration inputs and other data to assist the audio clip comparison software. For example, the speech-to-text recognition software may receive metadata associated with the audio data file pertaining to the location the audio clip was taken, the gain settings of the microphone taking the clip, the time of day the clip was taken, and the like. The audio clip comparison software may process the audio clip data file and return a manifest of associated keywords in step 440. The associated key words may be derived by extracting information pertaining to matching audio clips. For example, the audio clip comparison software may find a matching audio. Descriptions of this audio clip may be used to develop key words or a corresponding description of the subject audio file. In addition to the descriptions, the audio clip comparison software may also provide a confidence level associated with the descriptions.

Both speech-to-text recognition software and audio clip comparison software may each be used on a single audio data file by proceeding through steps 415-420 and 425-430 in turn, respectively. The steps may be executed in any order. Speechto-text recognition generally works by identifying the words within the audio data file by abstracting phonetic detail in the audio clip and using speech recognition techniques. Speech-to-text recognition software uses extendible learning libraries to recognize speech in audio clips. Audio clip comparison software generally works by extracting the low frequency components from the audio clip by transforming the audio clip into the frequency domain, using, e.g., a Fast Fourier Transform (other frequency domain transforms may also be used). A database of similarly extracted low frequency components from a library of audio clips is used to identify similar frequency patterns in the frequency domain. Once similar audio clips are identified, description information about the similar audio clips can be used as a proxy for the subject audio data file. If a similar audio clip was extracted from a web crawler or does not otherwise have much description information associated with it, then words surrounding the audio clip may be used to find pertinent description information. For example, suppose the audio clip comparison database is made up of audio clips that were found on the Internet and indexed into the database. Text information located on the same webpage as the found audio clip may be used to discern contextual information about the audio clip. This context information may also be indexed into the database of audio clips or may be processed once the similarity has been determined.

Figure 5:
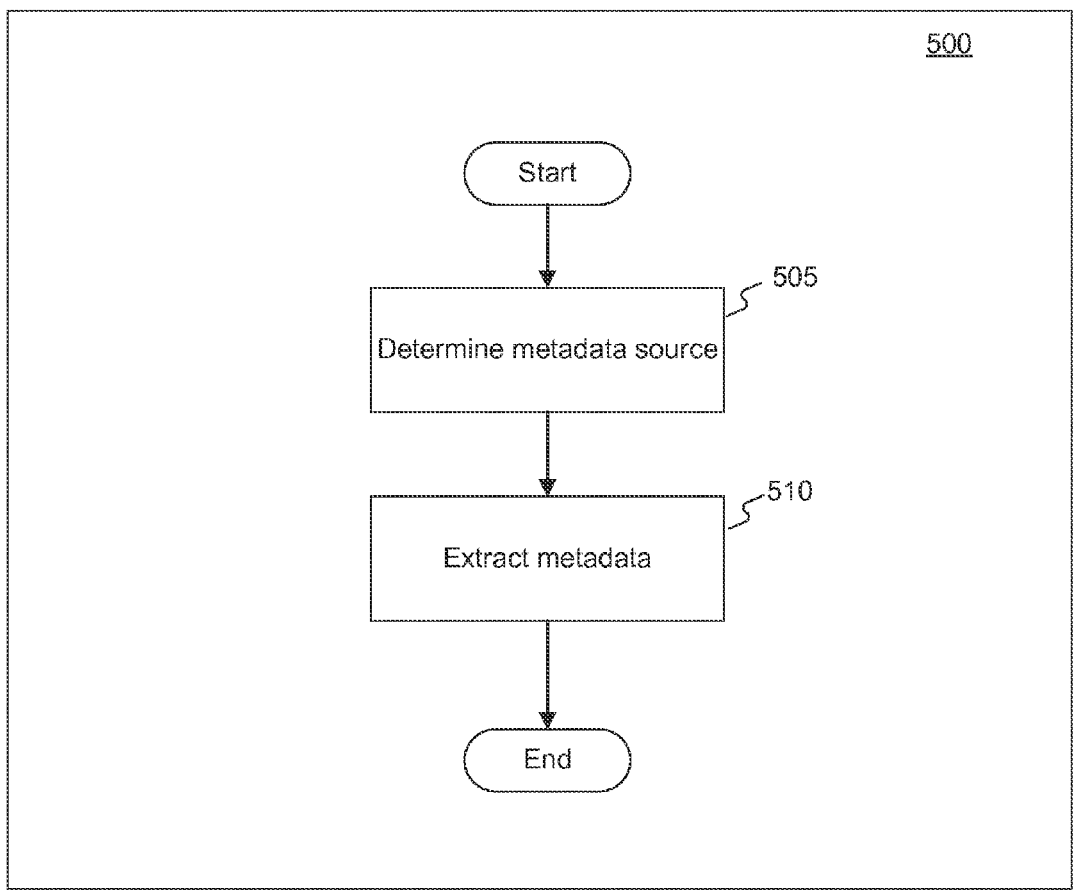
FIG. 5 is an exemplary illustration of the step "Capture Input" found in FIG. 2 pertaining to metadata.

FIG. 5 provides an exemplary illustration of one possible execution (exemplary process 500) of step 205 corresponding to the processing of metadata. The process 500 may be executed in addition to other options of executing step 205. For example, process 500 may be executed in addition to process 300 or process 400. In step 505, the metadata source is determined. As previously discussed, a user may submit an image data file or an audio data file for processing. In addition, a user may submit other file types containing metadata and request domain name suggestions based on these other files. In addition, a user may submit a Uniform Resource Locator (URL) where metadata may be found. For example, Twitter Tweets have metadata associated with them. A Tweet may be submitted to the domain name suggestion tool from which the metadata may be processed. Other objects located at a URL containing metadata may also be processed. A URL to a Google map (or other online map) may be submitted. The information present at that map URL may be used as a submission to the name suggestion tool. For example, a URL to the Google map locating a famous landmark, may result in the suggestion of names pertaining to the landmark or addresses and places nearby, based on the longitude and latitude metadata associated with the map and the landmark. Metadata may also be directly submitted to the domain name suggestion tool. For example, from a handheld mobile smart phone or other handheld device, GPS coordinates may be submitted to the domain name suggestion tool. In step 510, the metadata is extracted and processed. For example, for GPS coordinate data, from the GPS coordinates, the domain name suggestion tool may identify the closest famous landmark to the given GPS coordinates and suggest domain names based on the landmark. Multiple landmarks may be found, or the user may be able to select a particular landmark from a list of found landmarks.

Figure 6:
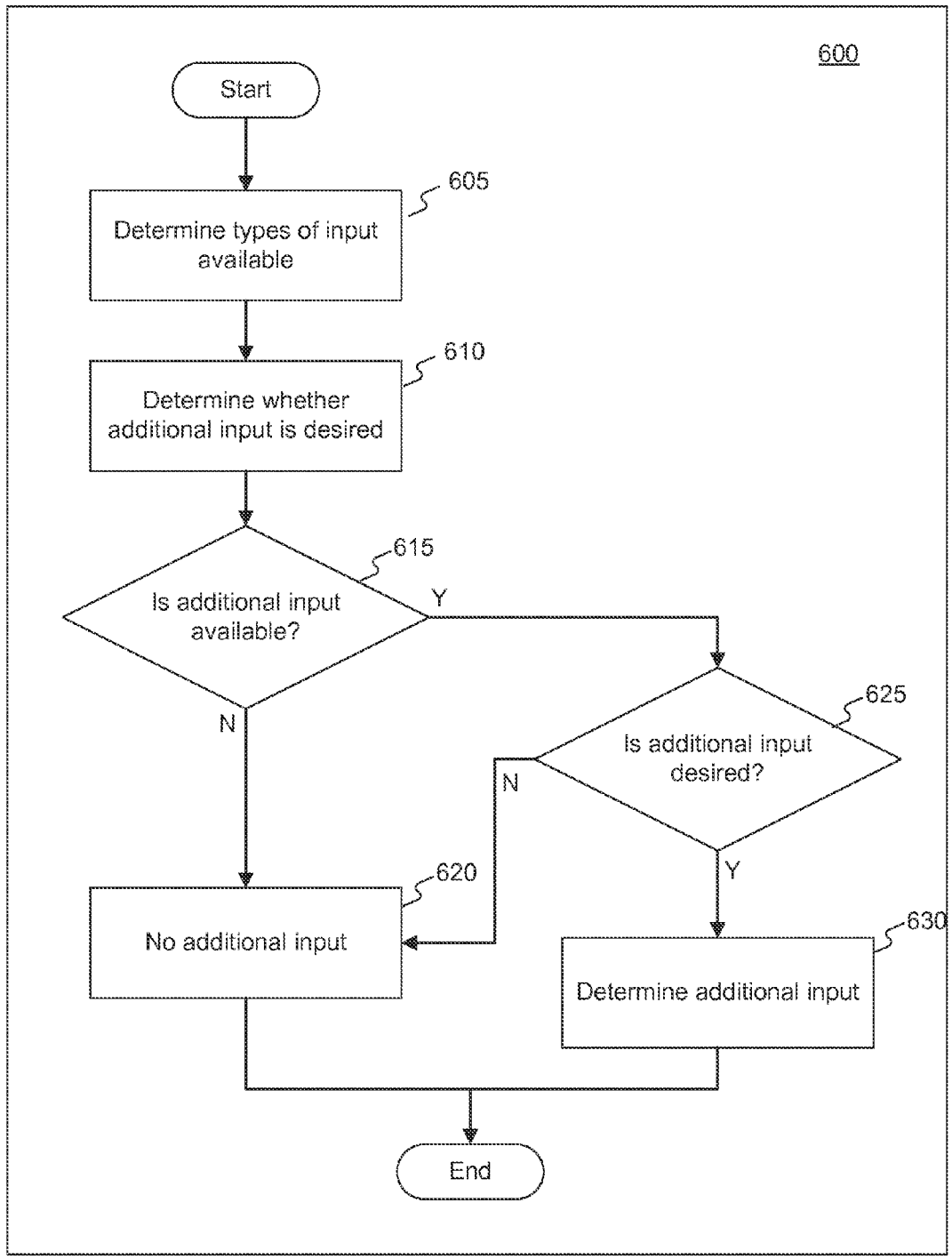
FIG. 6 is an exemplary illustration of the step "Additional Input" found in FIG. 1.

Turning back to step 115, FIG. 6 illustrates an exemplary process 600 of determining if additional input is available and if so, whether it should be processed. In step 605, the process determines whether additional types of input are available. The additional input may come from the same source. For example an image data file may include, e.g. image object data, image comparison data, and image data file metadata. The additional input may come from other sources. For example, the user may be able to submit several different types of input to retrieve domain name suggestions based on all of the input submitted. In step 610, the process determines whether additional input is desired. For example, the domain name suggestion tool may give the user the ability to select additional sources of input for the domain name suggestion. If an image file is used, the user may be prompted to select an image processing option. Once the image is processed using the image comparison tool, for example, the user may be prompted to select another processing means for the same input source. Also, the user may be prompted to select and submit an additional input source, such as another image, an audio file, or metadata source.

In step 615, if additional input is not available, then the process determines that there is no additional input in step 620. If additional input is available, then the process 625 asks whether additional input is desired. If additional input is not desired then the process again determines that there is no additional input in step 620. If, however, additional input is available and additional input is desired, then the process determines that additional input should be processed and the execution of the additional input will be processed at step 105. Otherwise, the data extracted from the various input sources will be processed via a name suggestion tool in step 120.

Figure 7:
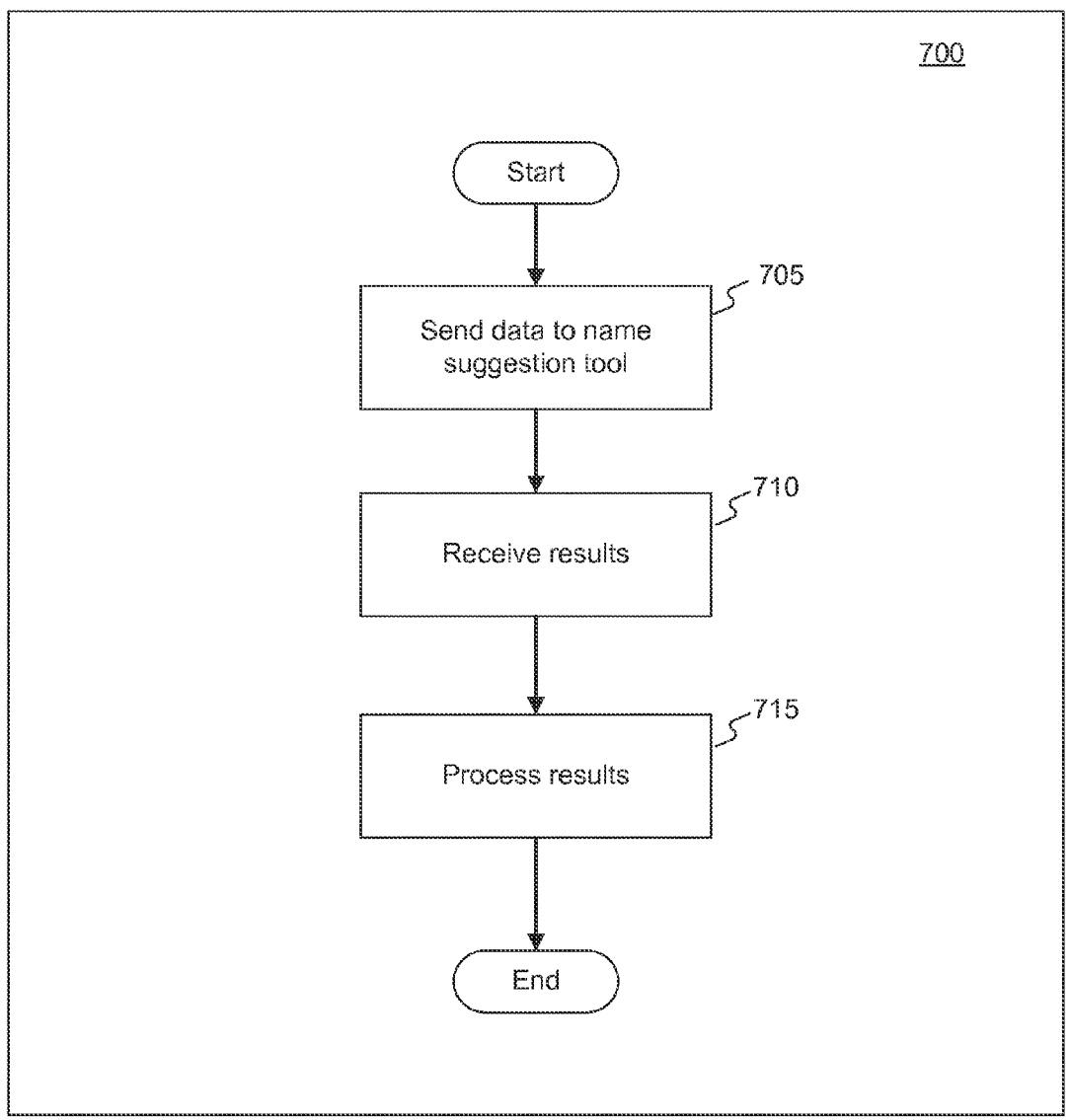
FIG. 7 is an exemplary illustration of the step "Process via Name Suggestion Tool" found in FIG. 1.

FIG. 7 illustrates an exemplary process 700 of processing the data via a name suggestion tool according to step 120. In step 705, the data is sent to a name suggestion tool. The data may be sent by formulating a submission string as described above when discussing step 120. Along with the data, preference settings may also be sent to the name suggestion tool. For example, if the user is interested only in particular TLDs or only in TLDs with a particular current registration status, then these preferences may be specified along with the submission data. In step 710, the results are received from the name suggestion tool. In step 715, the results are processed. Processing may include using a post filter to filter out results that the user has previously indicated as undesirable.

Once the name suggestions are processed the suggested names are provided according to step 125 and may be logged according to step 130, discussed above. Additionally, as discussed above, the user may be presented with registration options to register or purchase registration rights to domain names.

Resource Navigation Tool

Figure 8:
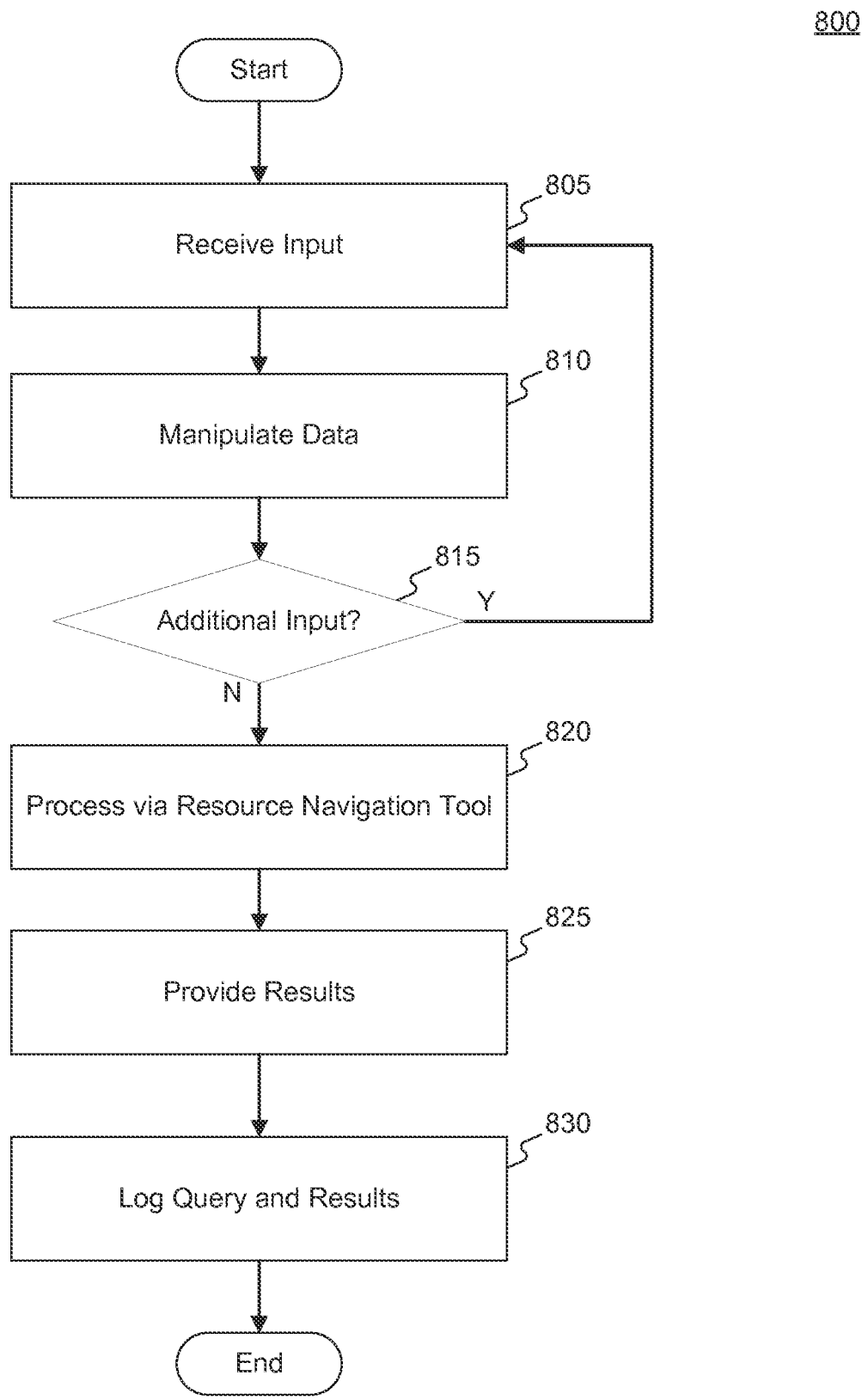
FIG. 8 is an exemplary illustration of a process of providing resource navigation links based on a variety of inputs.

FIG. 8 illustrates an exemplary process 800 of providing resource navigations links based on a variety of inputs, including image data, audio data, and metadata extracted from various sources. The process 800 may utilize various hardware components implemented in a system or may reside on a computer-readable medium as instructions to be executed by a processor. Computer-readable media are known to have non-transitory characteristics. The hardware components may contain one or more databases located thereon in support of the operation of process 100. The databases contained may be implemented in a commercial, open source, or proprietary database program or may be contained in log files, flat files, or any other data storage mechanism. Further, the databases need not be on a separate system, but may be incorporated with other services on one or more hardware components.

As explained in further detail below, in an embodiment, exemplary process 800 receives input (step 805). The input may come from image data, audio data, metadata found along with the image data or audio data, and/or metadata found extracted from other sources. In step 805, the process 800 may analyze the data input, extract information from the data, and based on the extracted information, provide words in the form of a submission string that may be used in the resource navigations links tool. Step 805 will be described in further detail below. Optionally, the input data may be manipulated (step 810) to provide refined information for the resource navigations links tool. The data may be manipulated by filtering out less pertinent or redundant data. For example, common words may be filtered out or the input data may be prioritized to place more significant words and phrases at the beginning of the submission string prior to submitting to the resource navigations links tool. In step 815, described in further detail below, the exemplary process 800 determines whether any additional inputs should be processed processing. If no additional inputs are to be processed, the submission string is sent to a resource navigations links tool in step 820. Optionally, the submission string may be sent along with preferences to assist the resource navigations links tool in providing desirable results.

The resource navigations links tool receives a submission string and offers resource navigation links based on the submission string. The resource navigations links tool may base its results on a number of factors, including whether an entry in a resource navigation database has been made that correlates information from the submission string with a resource navigation link, and the order of the words in the submission string (most important words and phrases in the front and least important words and phrases towards the back or the other way around), and/or Boolean words found in the submission string (e.g., "AND," "OR," and "NOT"). After the resource navigation links tool receives the submission string and optional preference settings, it transmits the results back.

The results are provided in step 825. The providing may be based on the method of input. For example, if the input was submitted via an application on a smart phone or hand held device, then the results may be provided via the application on the device. Alternatively, if the input was submitted via a web browser on a computer, then the results may be provided via the web browser. Optionally, the user may provide an email address and the results may also be emailed to the user. The delivery may also be in an audio format, which may be convenient if the user cannot divert attention to the screen of a hand held device or if the user is visually impaired. Delivery may be to a really simple syndication (RSS) feed, posted to a social networking site, posted to a blog or other online aggregator, or a combination of any of the delivery methods discussed and the like. The resource navigation links returned may be used for navigation to the resources linked. The links may provide session detail to retrieve the results in a web browser.

The user may be given an option to bookmark or mark as a favorite one or more of the resource navigation links for later retrieval. When a user bookmarks a resource navigation link or an entire set of resource navigation links, the user may retrieve the resource navigation link by the bookmark or by the listing of favorites. Upon retrieval, the system may update the resource navigation links based on the present status of the bookmarked or favorite resource navigation link(s). Furthermore, the user may categorize the bookmarks and favorites into user-created or predefined categories. Categories may be suggested by the resource navigation links tool based on the input data. Categories may be descriptive text labels and the like, or may simply be the input data. For example, the resource navigation links tool may save the input device and use the input data itself as the category. One skilled in the art will recognize many variations available of the bookmarking and favorite marking functions of the resource navigation links tool. For example, in addition to the user being able to bookmark or mark resource navigation links as favorites, the user may be able to save all of the resource navigation links provided. The user may also be able to save the search itself, that is, resubmit the search based on the same input at a later time, when the availability of resource navigation links may result in different resource navigation links provided.

The process 800 may log in step 830 the resource navigation links input submission information from step 805, log the pre-manipulation data from step 810, and log the submission string in step 820. Each input data source may be logged accordingly. The results from the resource navigation links tool in step 820 may also be logged. The logging may provide keying information to correlate all of the input data and result data. The logging information may be used to generate diagnostic and statistical information. Diagnostic information may assist the service provider to troubleshoot or further refine the process. Statistical information may be used to find trending data pertinent to the operation of the process. The process 800, may provide log, diagnostic, and statistical information through an interface.

The analysis of an image file, audio file, or metadata proceeds as outlined above, with reference to FIGS. 3, 4, and 5 of the name suggestion tool. Therefore, the processes 300, 400, and 500, are incorporated again as if set fully herein, except that references to the name suggestion tool should instead reflect the keyword resource navigation links tool of this section. Additionally, the discussions above, with respect to the incorporation of OCR technologies, is incorporated again as if set fully herein. Moreover, step 815 mirrors step 115 discussed above, and exemplary process 600 may also be applied to the inputs resource navigation links tool to determine whether additional inputs are to be processed. Therefore the process 600 is also incorporated again as if set forth fully herein, except that references to the name suggestion tool should instead reflect the keyword resource navigation links tool of this section.

Figure 9:
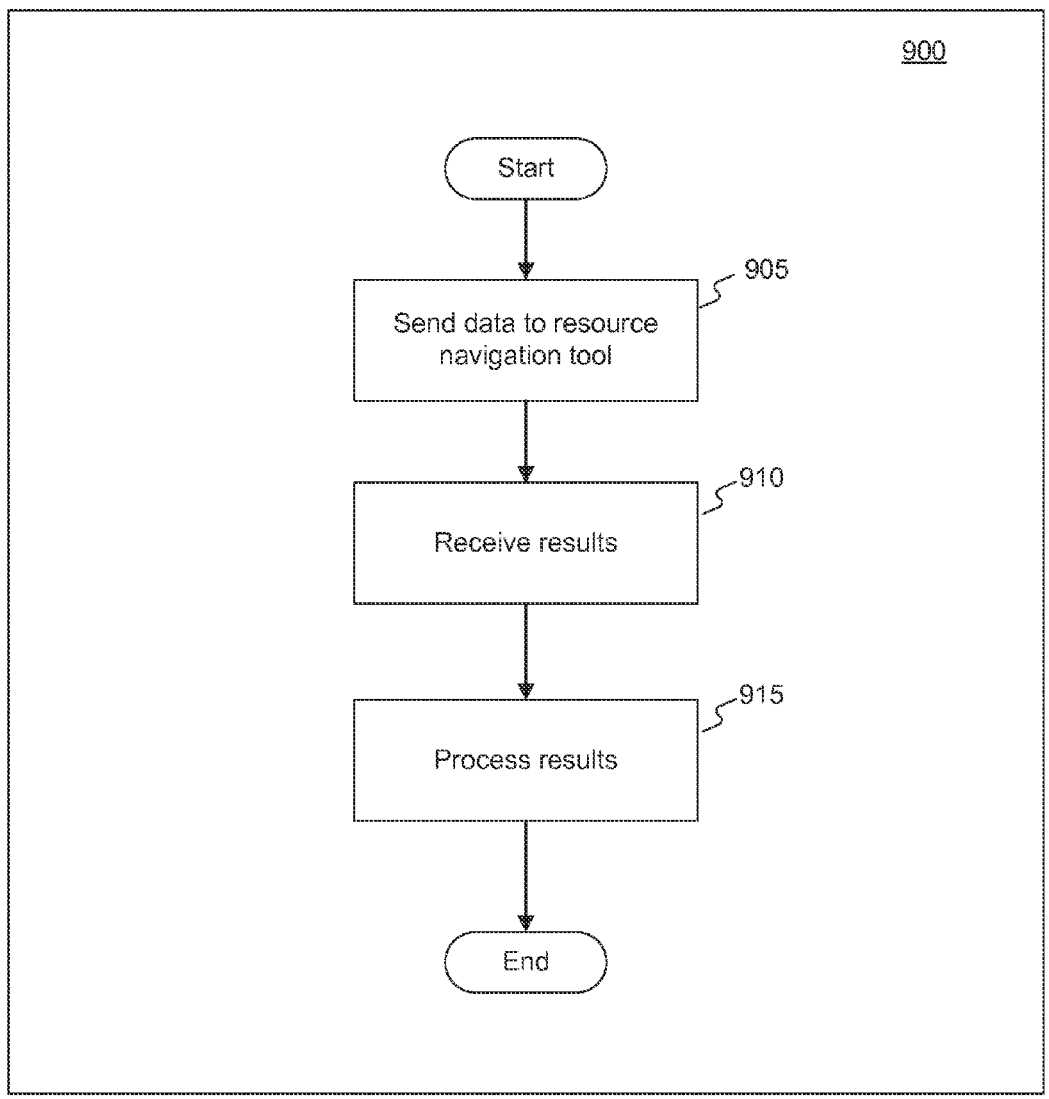
FIG. 9 is an exemplary illustration of the step "Process via Resource Navigation Tool" found in FIG. 8.

FIG. 9 illustrates exemplary process 900 which provides further detail to the process of step 820. In step 905, the data is sent to a resource navigation links tool. The data may be sent by formulating a submission string as described above when discussing step 820. Along with the data, preference settings may also be sent to the resource navigation links tool. In step 910, the results are received from the resource navigation links tool. If no results are available, the resource navigation links tool may provide the same submission string to an Internet search engine, resubmit the submission string after removing detail from the submission string to broaden it, or prompt the user to provide different or additional input. In step 915, the results are processed. Processing may include using a post filter to filter out results that the user has previously indicated as undesirable.

Once the resource navigation links are processed, the resource navigation links are provided according to step 825 and may be logged according to step 830, discussed above.

Figure 10:
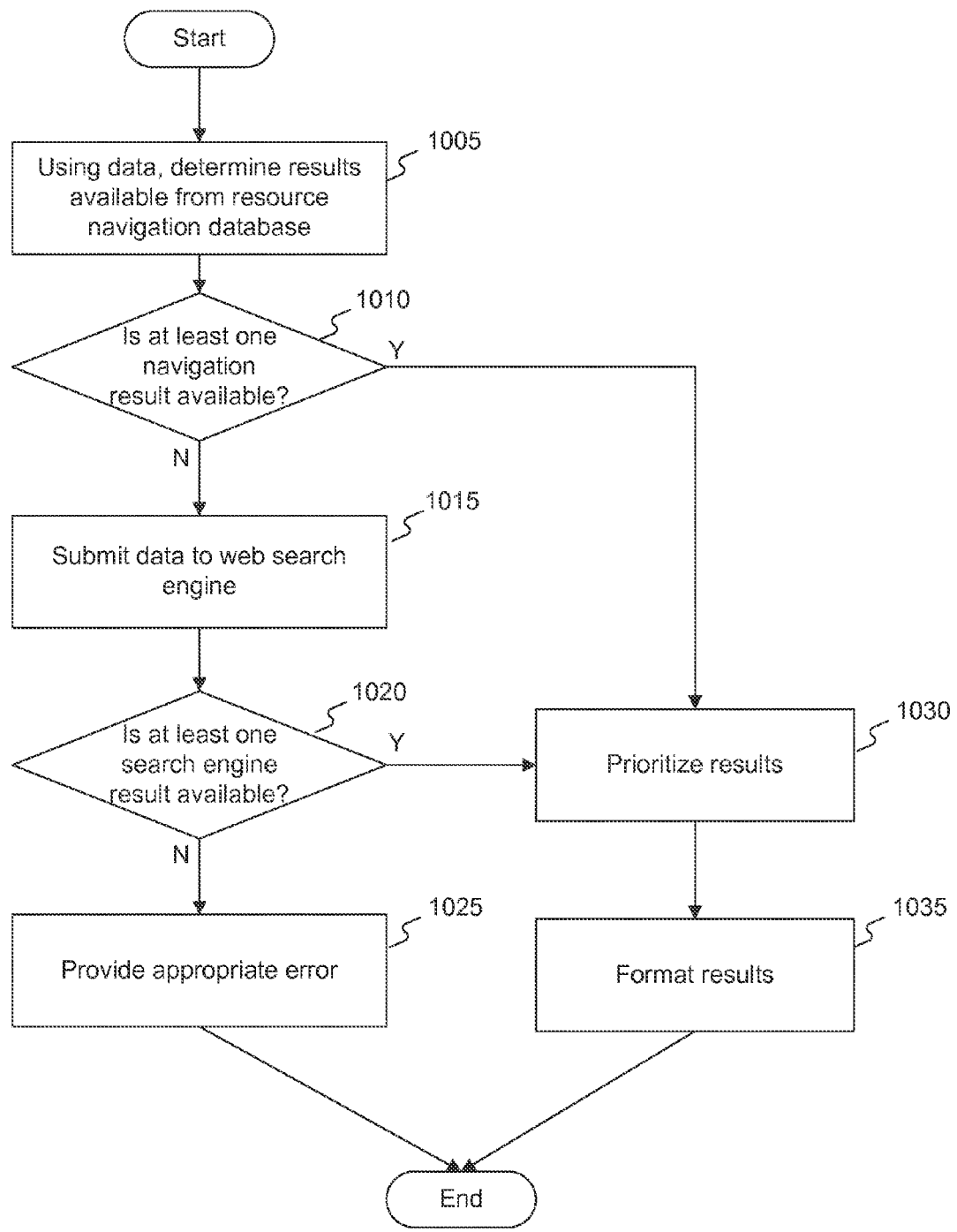
FIG. 10 is an exemplary illustration of a Resource Navigation Tool.

FIG. 10 illustrates an exemplary process to provide resource navigation links from requests. In other words, FIG. 10 discloses how a resource navigation links tool may operate. The submission string data is received by the resource navigation links tool (not illustrated). In step 1005, the submission string is used to determine a set of results available from the resource navigation database. The resource navigation database correlates keywords to resource navigation links. For example, the keyword "Toyota" may result in a link to Toyota's website. If GPS coordinates are also available in the submission string or accompanying data, then the resource navigation links may include links for Toyota's website and for the website of the nearest Toyota dealership. Step 1010 contemplates the situation when a submission string does not correlate to any keywords. If no resource navigation links are available, rather than returning an indication of zero results, the submission string optionally may be submitted to an Internet search engine as in step 1015 or filtered and resubmitted to the resource navigation links tool in step 1005. The filtering may alter the submission string to use synonyms of words or to remove words in order to broaden the submission string entry. Similar filtering may be done in the first place when receiving the submission string. For example, although a word in the submission string may not correlate to a keyword, the process of step 1005 may use synonyms for parts of the submission string that do correlate to keywords.

If the submission string was submitted to an Internet search engine, then the process would determine whether any navigation links were returned from the search engine in step 1020. If no navigation links were returned or the submission search string was not submitted to an Internet search engine, then the result of step 825 may be an appropriate error message as would be generated in step 1025. For example, the error message may prompt the user to submit different data, e.g., retake a picture from a different angle or in different lighting conditions, rerecord an audio clip for submission, or provide additional input. If some resource navigation links are available as a result of step 1005 or step 1015, then the results may optionally be prioritized in step 1030. The prioritization may emphasize or deemphasize more specific resource links by placing them first or last, respectively. The prioritization may also reflect a sponsorship level related to the keyword resource navigation database. For example, the resource navigation tool provider may sell subscriptions to navigation link providers (i.e., website owners) that correlate navigation links to keywords. In this case, the subscription level or subscription details may dictate the order of resource navigation links. Subscription details may include factors in any combination such as amount paid, length of subscription service, chronological order of subscription relative to other subscribers of the same keyword, the number of keywords subscribed to, and so forth.

The resource navigation link tool may format the results in step 1035. As resource navigation links, the formatting may include additional information about each link, such as providing a snippet or excerpt of information from the target link's web site. Accessory links may also be provided for each resource navigation link to provide expanded results, results similar to the resource navigation link, or reviews for each of the resource navigation links. The results may also include a link to report problems or inaccurate or incorrect keyword resource navigation link results.

As discussed above, the links are provided to the user in step 825 and appropriate logging may occur in step 830.

Other embodiments of the disclosure will be apparent to those skilled in the art from consideration of the specification and practice of the embodiments disclosed herein. In particular, it should be appreciated that the processes defined herein are merely exemplary, and that the steps of the processes need not necessarily be performed in the order presented. It is intended that the specification and examples be considered as exemplary only, with a true scope and spirit of the embodiments being indicated by the following claims.

What is claimed is:

1. A computer-implemented method of generating resource navigation links based on inputs comprising:
    receiving, at a computer, an input source, wherein the input source corresponds to at least one of an image data file, an audio data file, or metadata source;
    processing, via the computer, the input source to extract information from the input source;
    building, via the computer, a submission string based on the extracted information, wherein the building comprises prioritizing words in the extracted information to place more significant words at a beginning of the submission string;
    submitting the submission string to a resource navigation link tool;
    receiving a resource navigation link from the resource navigation link tool when the submission string correlates with one or more keywords in the resource navigation link; and
    submitting the submission string to an internet search engine when the submission string does not correlate with the one or more keywords in the resource navigation link.

2. The method of claim 1, wherein the input source corresponds to at least one image data file and the processing comprises:
    submitting the image data file to an object recognition service; and
    receiving from the object recognition service a list containing at least one recognized object from the image data file.

3. The method of claim 1, wherein the input source corresponds to at least one image data file and the processing comprises:
    submitting the image data file to an image comparison service; and
    receiving from the image comparison service, image information based on at least one similar image.

4. The method of claim 3, comprising:
    determining additional information about the at least one similar image by extracting information from a website where the at least one similar image was found.

5. The method of claim 1, wherein the input source corresponds to at least one image data file and the processing comprises:
    submitting the image data file to an optical character recognition tool; and
    receiving from the optical character recognition tool, image information based on recognized characters found within the image.

6. The method of claim 1, wherein the input source corresponds to at least one audio data file and the processing comprises:
    submitting the audio data file to an speech recognition service; and
    receiving from the speech recognition service, a string containing at least one recognized word from the audio data file.

7. The method of claim 1, wherein the input source corresponds to at least one audio data file and the processing comprises:
    submitting the audio data file to an audio clip comparison service; and
    receiving from the audio clip comparison service, information based on at least one similar audio clip.

8. The method of claim 1, wherein the input source corresponds to at least one metadata source and the processing comprises:
    extracting metadata from the metadata source; and
    processing the metadata to create extracted information based on the metadata source.

9. The method of claim 8, wherein the extracted information comprises GPS coordinates related to the metadata source.

10. The method of claim 1, further comprising providing the resource navigation link, wherein the providing comprises at least one of:
displaying the resource navigation link;
emailing the resource navigation link to an email address; or
playing speech corresponding to the resource navigation link.

11. The method of claim 10, wherein the emailing comprises including a link to retrieve the resource navigation link via a web browser interface.

12. The method of claim 1, wherein the resource navigation link is based on keywords in a keyword resource navigation database.

13. The method of claim 1, comprising:
receiving a selection of resource navigation links to save for later retrieval; and
storing data corresponding to the selection in a database.

14. A system of generating resource navigation links based on inputs comprising:
a non-transitory memory storing instructions; and
a processor executing the instructions to cause the system to perform a method comprising:
receiving, at a computer, an input source, wherein the input source corresponds to at least one of an image data file, an audio data file, or metadata source;
processing, via the computer, the input source to extract information from the input source;
building, via the computer, a submission string based on the extracted information, wherein the building comprises prioritizing words in the extracted information to place more significant words at a beginning of the submission string;
submitting the submission string to a resource navigation link tool;
receiving a resource navigation link from the resource navigation link tool when the submission string correlates with one or more keywords in the resource navigation link; and
submitting the submission string to an internet search engine when the submission string does not correlate with the one or more keywords in the resource navigation link.

15. The system of claim 14, wherein the input source corresponds to at least one image data file and the processing comprises:
submitting the image data file to an object recognition service; and
receiving from the object recognition service a list containing at least one recognized object from the image data file.

16. The system of claim 14, wherein the input source corresponds to at least one image data file and the processing comprises:
submitting the image data file to an image comparison service; and
receiving from the image comparison service, image information based on at least one similar image.

17. The system of claim 16, wherein the method comprises:
determining additional information about the at least one similar image by extracting information from a website where the at least one similar image was found.

18. The system of claim 14, wherein the input source corresponds to at least one image data file and the processing comprises:
submitting the image data file to an optical character recognition tool; and
receiving from the optical character recognition tool, image information based on recognized characters found within the image.

19. The system of claim 14, wherein the input source corresponds to at least one audio data file and the processing comprises:
submitting the audio data file to an speech recognition service; and
receiving from the speech recognition service, a string containing at least one recognized word from the audio data file.

20. The system of claim 14, wherein the input source corresponds to at least one audio data file and the processing comprises:
submitting the audio data file to an audio clip comparison service; and
receiving from the audio clip comparison service, information based on at least one similar audio clip.

21. The system of claim 14, wherein the input source corresponds to at least one metadata source and the processing comprises:
extracting metadata from the metadata source; and
processing the metadata to create extracted information based on the metadata source.

22. The system of claim 21, wherein the extracted information comprises GPS coordinates related to the metadata source.

23. The system of claim 14, wherein the method further comprises providing the resource navigation link, and wherein the providing comprises at least one of:
displaying the resource navigation link;
emailing the resource navigation link to an email address; or
playing speech corresponding to the resource navigation link.

24. The system of claim 23, wherein the emailing comprises including a link to retrieve the resource navigation link via a web browser interface.

25. The system of claim 14, wherein the resource navigation link is based on keywords in a keyword resource navigation database.

26. The system of claim 14, wherein the method comprises:
receiving a selection of resource navigation links to save for later retrieval; and
storing data corresponding to the selection in a database.

27. A non-transitory computer-readable storage medium containing instructions which, when executed on a processor, perform a method comprising:
receiving, at a computer, an input source, wherein the input source corresponds to at least one of an image data file, an audio data file, or metadata source;
processing, via the computer, the input source to extract information from the input source;
building, via the computer, a submission string based on the extracted information, wherein the building comprises prioritizing words in the extracted information to place more significant words at a beginning of the submission string;
submitting the submission string to a resource navigation link tool;

receiving a resource navigation link from the resource navigation link tool when the submission string correlates with one or more keywords in the resource navigation link; and submitting the submission string to an internet search engine when the submission string does not correlate with the one or more keywords in the resource navigation link.

28. The computer-readable storage medium of claim 27, wherein the input source corresponds to at least one image data file and the processing comprises:

submitting the image data file to an object recognition service; and receiving from the object recognition service a list containing at least one recognized object from the image data file.

29. The computer-readable storage medium of claim 27, wherein the input source corresponds to at least one image data file and the processing comprises:

submitting the image data file to an image comparison service; and receiving from the image comparison service, image information based on at least one similar image.

30. The computer-readable storage medium of claim 29, wherein the method comprises:

determining additional information about the at least one similar image by extracting information from a website where the at least one similar image was found.

31. The computer-readable storage medium of claim 27, wherein the input source corresponds to at least one image data file and the processing comprises:

submitting the image data file to an optical character recognition tool; and receiving from the optical character recognition tool, image information based on recognized characters found within the image.

32. The computer-readable storage medium of claim 27, wherein the input source corresponds to at least one audio data file and the processing comprises:

submitting the audio data file to an speech recognition service; and receiving from the speech recognition service, a string containing at least one recognized word from the audio data file.

33. The computer-readable storage medium of claim 27, wherein the input source corresponds to at least one audio data file and the processing comprises:

submitting the audio data file to an audio clip comparison service; and receiving from the audio clip comparison service, information based on at least one similar audio clip.

34. The computer-readable storage medium of claim 27, wherein the input source corresponds to at least one metadata source and the processing comprises:

extracting metadata from the metadata source; and processing the metadata to create extracted information based on the metadata source.

35. The computer-readable storage medium of claim 34, wherein the extracted information comprises GPS coordinates related to the metadata source.

36. The computer-readable storage medium of claim 27, wherein the method further comprises providing the resource navigation link, and wherein the providing comprises at least one of:

displaying the resource navigation link;

emailing the resource navigation link to an email address; or playing speech corresponding to the resource navigation link.

37. The computer-readable storage medium of claim 36, wherein the emailing comprises including a link to retrieve the resource navigation link via a web browser interface.

38. The computer-readable storage medium of claim 27, wherein the resource navigation link is based on keywords in a keyword resource navigation database.

39. The computer-readable storage medium of claim 27, wherein the method comprises:

receiving a selection of resource navigation links to save for later retrieval; and storing data corresponding to the selection in a database.

40. The method of claim 1, wherein the resource navigation link provides access to a website selected by a person related to the website.

41. The method of claim 40, wherein the website is not selected by the internet search engine.

* * * * *